(12) United States Patent
Khoshnevisan et al.

(10) Patent No.: US 7,765,227 B1
(45) Date of Patent: **\*Jul. 27, 2010**

(54) SELECTION OF SEARCH CRITERIA ORDER BASED ON RELEVANCE INFORMATION

(75) Inventors: Cyrus Khoshnevisan, Palo Alto, CA (US); Asif Mansoor Ali Makhani, San Jose, CA (US)

(73) Assignee: A9.com, Inc., Palo Alto, CA (US)

( \* ) Notice: Subject to any disclaimer, the term of this patent is extended or adjusted under 35 U.S.C. 154(b) by 185 days.

This patent is subject to a terminal disclaimer.

(21) Appl. No.: 11/694,904

(22) Filed: Mar. 30, 2007

(51) Int. Cl.
*G06F 17/30* (2006.01)
(52) U.S. Cl. .................................................. 707/769
(58) Field of Classification Search ............... 707/609, 707/705, 752, 769, 802; 715/700, 744; 706/48
See application file for complete search history.

(56) References Cited

U.S. PATENT DOCUMENTS 6,571,249 B1 \* 5/2003 Garrecht et al. ............. 707/100
2003/0164844 A1 \* 9/2003 Kravitz et al. ............... 345/700
2007/0011146 A1 \* 1/2007 Holbrook ....................... 707/3

\* cited by examiner

*Primary Examiner*—Fred I Ehichioya
(74) *Attorney, Agent, or Firm*—Townsend and Townsend and Crew LLP (57) ABSTRACT

The present invention is directed to a method and system for refining a search to locate information about an item based on predetermined search categories. More specifically, the method and system dynamically display search categories based on relevancy information of a search result. A search category generally includes a set of category values which are used to filter the data entries into a subset of the search result. The data entries are returned after searching on data stores with a search query provided by a user and then the ranks of the returned data entries are determined based on a degree of relevancy with the search query. The data entries are displayed in order of the ranks and the set of category values for a search category are displayed to reflect the ranks of the data entries.

35 Claims, 8 Drawing Sheets

SELECTION OF SEARCH CRITERIA ORDER BASED ON RELEVANCE INFORMATION

BACKGROUND

In a typical network-based merchandising environment, users can search for available items with several keywords related to the items. For example, a user may be able to search information about a specific item by providing a search engine with information such as a name of the item, a manufacturer name of the item, and/or characteristics of the item. However, as the size of the network-based merchandising environment has increased, so has the number of available items and information related to the available items. One aspect of this growth is that a typical search result is simply too large for the user to browse.

Oftentimes, the search results can be sorted so that the user is presented with the potentially most relevant item for which the user is searching. In the event that the search results are too large, users can submit additional search criteria or alternative search criteria in order to reduce the size of the search results. To enable users to easily accomplish this, some search engines provide additional search tools that facilitate the display of pre-categorization of the search results. The pre-categorization of the search results is provided to enable users to choose additional search criteria such as characteristics shared by numerous items or alternative search criteria of the search results.

Although the inclusion of pre-categorization can improve a general searching experience, users still can have difficulty utilizing pre-categorization to identify more relevant search criteria. In one aspect, the displayed pre-categorization, for example, search categories, typically does not reflect the particular attributes of the currently displayed search results. In some instances, the pre-categorization is displayed based on the cardinal number of corresponding data entries while the search results are displayed based on a degree of relevancy of data entries. This inconsistency between the displayed pre-categorization and the displayed search results can make a user confused when identifying more relevant search criteria from the displayed pre-categorization.

For example, if the search results are pre-categorized by a brand name, the most common brand names found in the data entries of the search results are typically displayed as top choices for pre-categorization. However, the most common brand names can be different from the brand names of the items which are determined to be potentially more relevant to the search query. For example, when a user is looking for a particular type of shoes but does not know that such type of shoes are typically manufactured under brand name "A," the user may input a search query describing the particular type of shoes without specifying the brand name. Conventional search engines may determine items having the brand name "A" for more relevant items than items having other brand names and the search results are displayed accordingly. In some instances, the search result can be effectively narrowed down by the brand name "A." However, the brand name "A" may not be presented as the first choice of the pre-categorization unless the brand name "A" is determined to be the most common brand name. Such deficiency can lead the user to choose the less relevant brand names over the brand name "A," which tend to result in a search of less relevant items.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a computer-implemented method is provided for dynamically displaying categorized information about items based on an order of displayed items. The computer-implemented method includes receiving a search query to locate an item, obtaining data entries which result from a search with the search query, and determining ranks for the data entries and identifying a first set of the data entries based on the determined ranks. A set of category values and a set of search categories are obtained from the data stores. A search category is pre-defined to assist a user to refine the search by providing additional search criteria. The set of category values for the search category are ordered based on the ranks for the first set of the data entries. A selection from the displayed set of category values is received to narrow the search results.

In accordance with another aspect, a computer system displays search categories based on an order of displayed items. The computer system comprises data stores and a computing device in communication with the data stores. The data stores store information relating to a set of search categories and information about available items. The computing device receives a search query to locate an item, obtains an initial search result from a search on the data stores with the search query and determines ranks for data entries in the initial search result. The computing device identifies a first set of the data entries based on the determined ranks and subsequently, for each search category, an ordered set of category values are obtained. The computing device displays the ordered set of category values based on the ranks for the first set of the data entries. A selection from the displayed set of category values is received from the user to narrow the initial search result.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present disclosure relate to a method and system for refining a search to locate a particular item by utilizing predetermined search categories. As will be described in more detail below, the predetermined search categories include a set of category values which are used to filter the search results. More specifically, a user is presented with dynamically ordered category values for each search category, which category values have been determined based on aspects of the most relevant items to a search query. The user can identify, from the ordered category values for a particular search category, additional search criteria which are more relevant to the desired item. In an aspect of the present invention, the search results are ranked based on relevancy, such as a degree of relevancy, relevancy score, etc. Based on the rank information, the category values of a search category may be dynamically ordered. With each successive search with additional search criteria, the user can further narrow the search results to locate the particular item.

Figure 1:
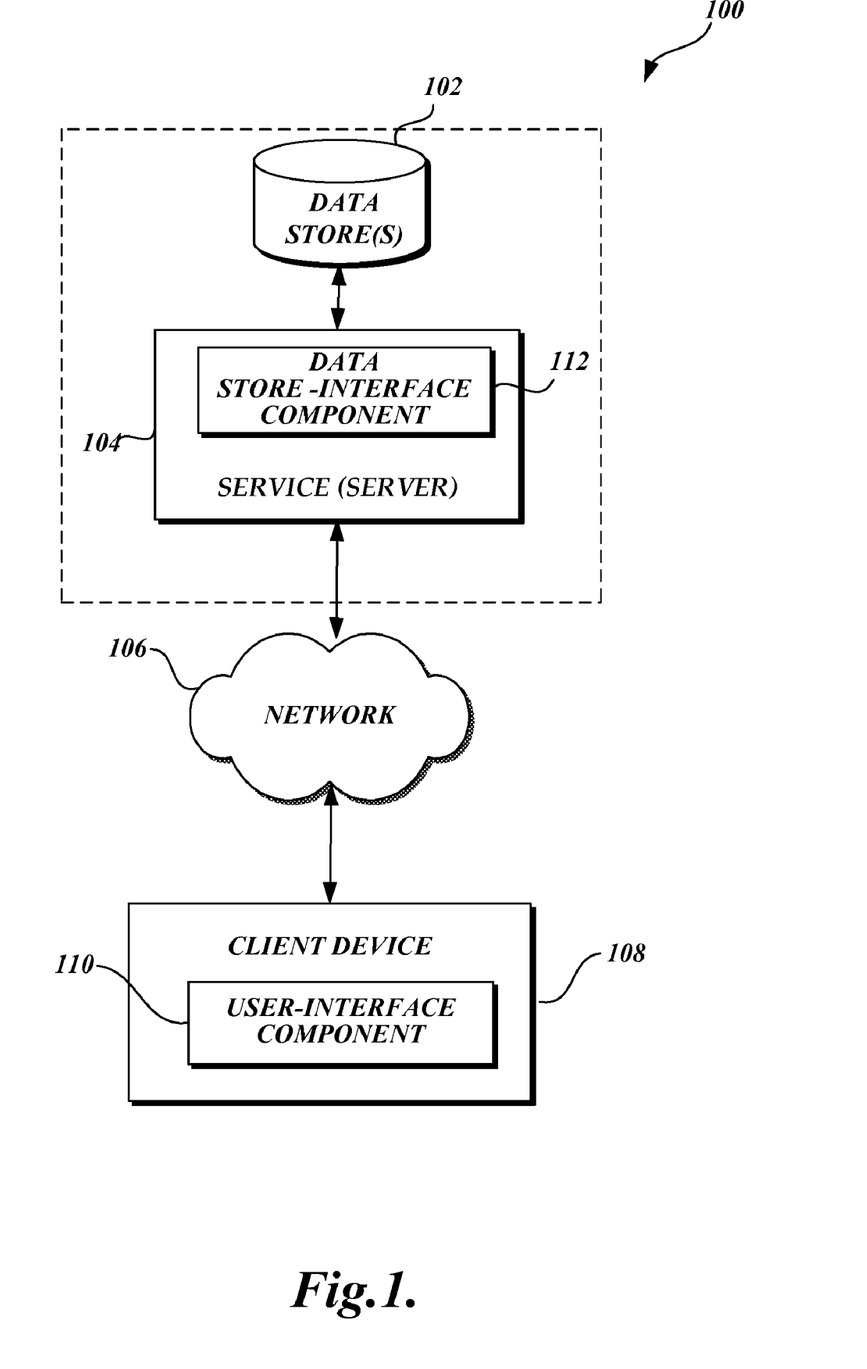
FIG. 1 is a block diagram of an illustrative operating environment including a number of data stores, a service server, and a client device in accordance with an aspect of the present invention.

With reference now to FIG. 1, an illustrative operating environment 100 can include a service server (service) 104 for searching data entries from one or more data stores 102, such as a catalog, search index, etc., and a client device 108 to facilitate user interaction. The one or more data stores 102 can provide search results to the service 104 in response to a search query request which is in turn provided to the client device for display to a user. For example, if a user wants to find items related to a pair of jeans, the user may input search keywords describing the pair of jeans for search. In an illustrative embodiment, several data entries related to a pair of jeans are stored in the data store 102.

Each data entry can be stored and organized in any suitable way that allows each data entry to be searched or indexed based on common categories and/or attribute values. As will be discussed in greater detail below, a set of search categories and corresponding values may be predefined to group search results for a particular item. For example, if "color" is predefined as a search category for the particular item, and the "color" search category has attribute values such as, "yellow," "black," "white," "blue," etc., the search results resulting from the data entries stored in the data store(s) 102 may be grouped based on their color attribute values.

Figure 6:
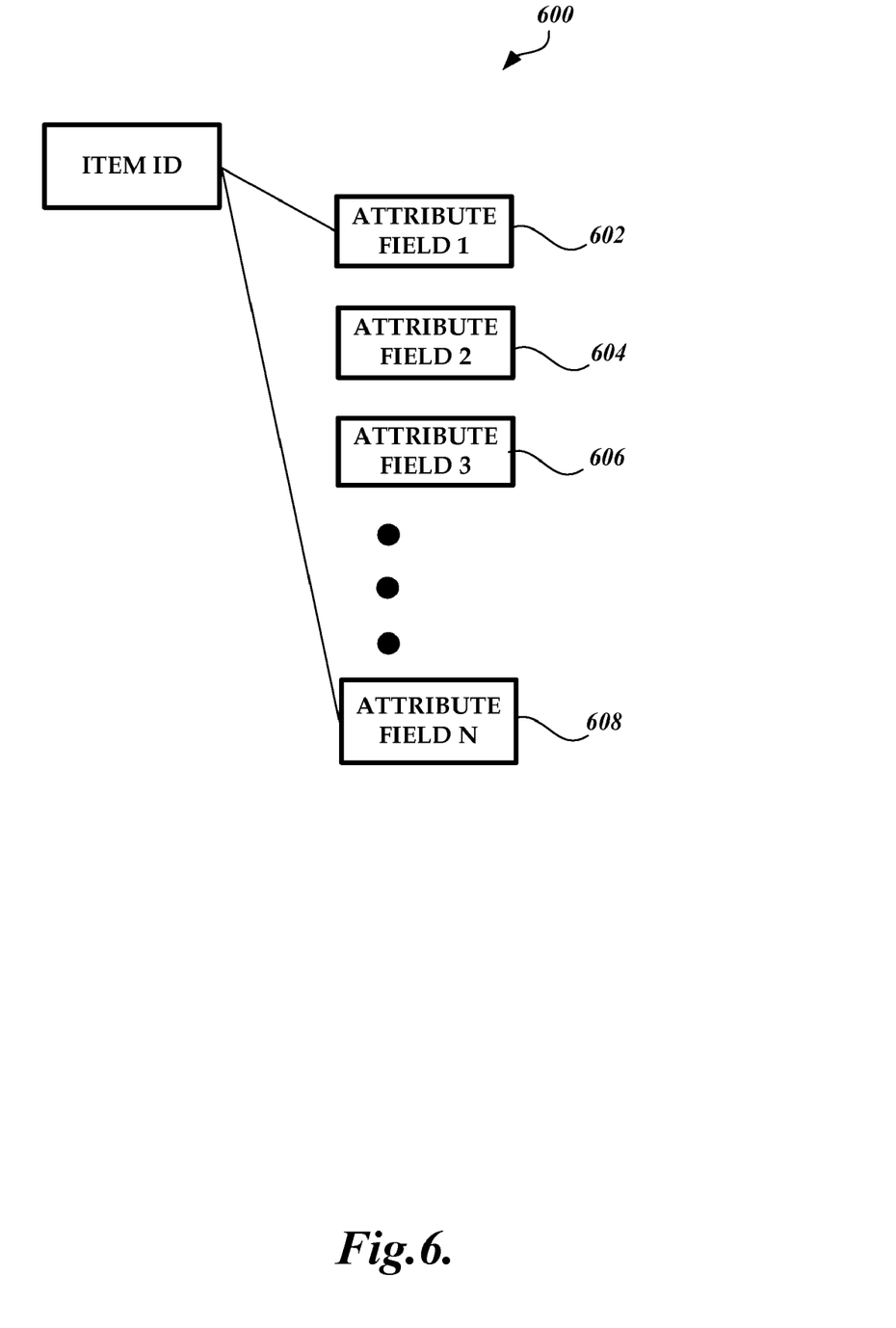
FIG. 6 is a block diagram of an illustrative data entry stored in a data store of the operation environment that includes several attribute fields used to describe item available for search.

As will be appreciated by one of ordinary skilled in the art, each data entry in the data store 102 may correspond to a set of structured set of attribute fields and corresponding values. Referring to FIG. 6, a block diagram 600 depicts a data entry corresponding to a set of attribute fields 602-608 in accordance with an aspect of the present invention. The set of structured attribute fields will be used to store information particular to an item corresponding to the data entry. For example, if an item is related to women's active wear, several attribute fields are defined to have attribute values related to an item identifier, such as product category, style, size, price, manufacturer, color, seller, type, promotion, etc. Further, the attribute fields can be defined for a group of data entries so that the data entries can be searched or indexed based on a common category and/or attribute values.

In one embodiment, the data entries may be ranked by the service 104 based on a ranking policy or ranking rules. For example, the data entries may be ranked based on a degree of relevancy between the data entries and the search query. The category values of a search category may be ordered to reflect the ranking information of the data entries so that users can effectively narrow the search by selecting a category value most relevant to the particular item for which the user is looking. Returning to the above-mentioned example, if the first ranked data entry has "white" for its color attribute value and if the second ranked data entry has "yellow" for its color attribute value, "white" is displayed first followed by "yellow" among other category values for the color search category.

Returning to FIG. 1, the server 104 may include a data-store interface component 112 that obtains data entries from one or more data stores 102 or from one or more remote data stores 102 over a network 106. The client device 108 may include a user-interface component 110 can obtain the search results (data entries) from the data-store interface component 112 for display to a user. In an illustrative embodiment, the user-interface component 110 represents the front-end of a stand-alone application, such as a Web browser. Alternatively, the user-interface component 110 can be integrated with one or more software applications. For example, the user-interface component 110 could be integrated into a customized purchasing system such that potential purchasers are able to view and manipulate the search result before making a purchase.

One skilled in the relevant art will appreciate that the data and/or components may be stored on a computer-readable medium and loaded into memory of the client device 108 using a drive mechanism associated with the computer-readable medium, such as a floppy, CD-ROM, DVD-ROM drive, or network interface. Further, the components can be included on a single device or distributed in any manner. For example, all the components could be located on the client device 108. Furthermore, the components can be integrated in any manner. For example, the user-interface component 110 and data-store interface component 112 could be integrated into a single component. Furthermore, the components shown in FIG. 1 represent an illustrative embodiment. In other embodiments, components can be removed or their functionality can be provided by another component. For example, the service component 104 and data-store interface component 112 may be removed or their functionality could be provided by another component.

Figure 2A:
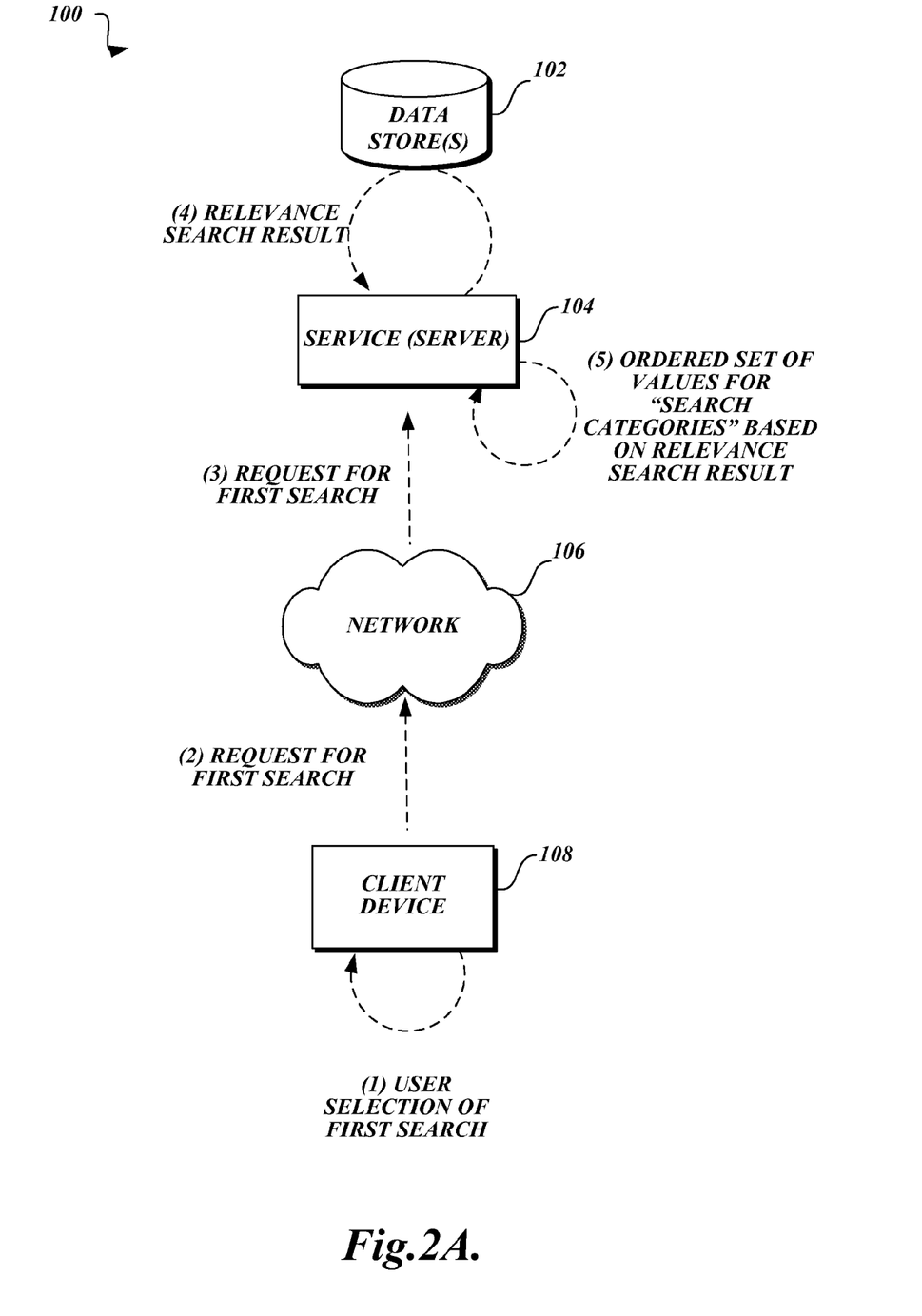
FIGS. 2A-2B are block diagrams of the operating environment of FIG. 1 illustrating interactions of various components therein when a client device submits a search query to the service server and the service server returns search categories including category values ordered based on rank information.
Figure 2B:
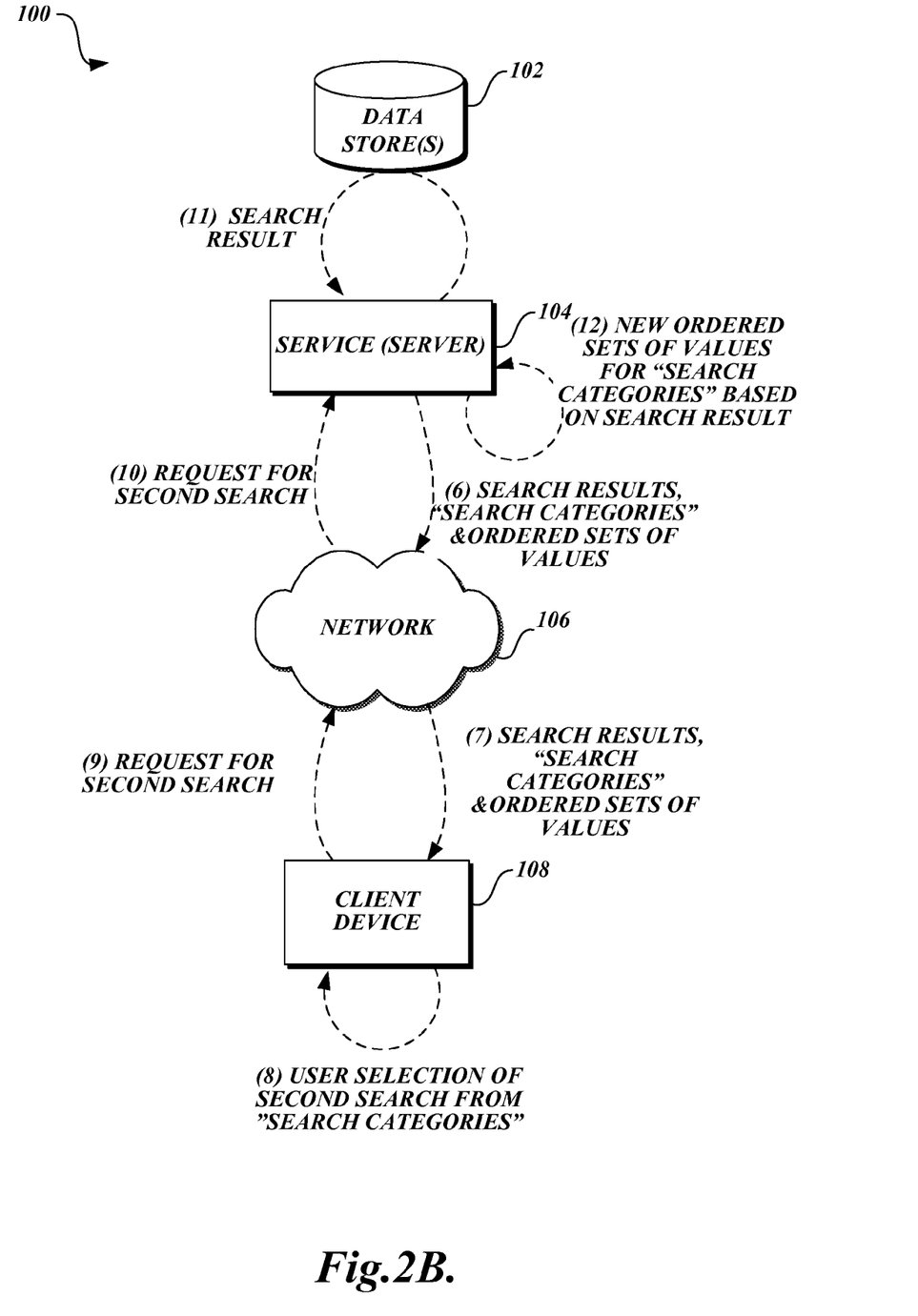

With reference now to FIGS. 2A-2B, the interaction by various components of the operating environment 100 to dynamically display the category values of each search category in order corresponding to the rank information of the search results will be described. As illustrated in FIG. 2A, a user may make a selection for a search request of an initial search. For example, an initial search can be selected by clicking a hyperlink representing categories within a Web page. For another example, an initial search can be selected by choosing a search menu choice provided within a Web page. Alternatively, a user may input a search query including several keywords. A client device 108 may issue a request for the initial search. The request for the initial search can be transmitted via a communications network 106, such as the Internet. A service 104 obtains the request and issues a query to the data store 102 for initial search with the search query, such as keywords, categories, etc. For example, if the user selects a "denim" product category for a search request, the client device transmits a search request for locating items in the "denim" product category. Then, the service 104 would issue a query request to the data store 102 for data entries related to the "denim" product category.

In response to the query request, the data store 102 provides the initial search results (data entries) to the service 104. A set of search categories predefined for the search may also be obtained from the data store 120. Each search categories includes a set of category values which are used to filter the data entries into a subset of the initial search result. The initial search results may be ranked in accordance with ranking rules and policies. In one embodiment, the initial search results may be ordered based on a degree of relevancy between the search query and a data entry stored in the data store. For example, the service 104 may rank the initial search results based on the ranking policies and rules, such as a relevancy algorithm that associates a relevancy score to the data entries in the search index and/or catalog. Subsequently, the service 104 generates an ordered set of category values for each search category based on the ranks of data entries in initial search results.

Although the initial search result can be ranked through any suitable ranking methods, to ease the discussion, the examples and embodiments described herein use the ranks determined based on the degree of relevancy.

As illustrated in FIG. 2B, once the service 104 ranks the initial search results and generates an ordered set of category values for each search category, the service 104 transmits to a client device 108 the ranked initial results, search categories, the ordered sets of category values based on relevancy, and the corresponding page data. The ranked initial results, the search categories, the ordered sets of search category values, and the corresponding page data can be transmitted via a communications network 106. After the client device 108 obtains the ranked initial results, the search categories, the ordered set of search category values, and the corresponding page data, the client device 108 can display the results for the search request, along with the search categories to a user. Each search category may be displayed with an ordered set of category values. For example, the page data can be used to construct a user interface, such as a Web page, which can be used to present the initial search results in order of ranks and the search categories with the ordered set of search category values. The ordered set of category values may be presented to users to reflect the correlation with the ranking information of data entries displayed in a Web page. For example, the Web page is constructed to present the first five data entries from the ranked initial search results along with the determined and ordered values for the search categories. The value of the search categories determined are based on the attribute values of the currently displayed data entries and further are ordered based on the ranking information of the currently displayed data entries in the Web page.

A user can make a selection of a category value from the displayed search categories in order to narrow the initial search result. For example, a category value could be selected by clicking one of graphic components displayed on the Web page, such as hyperlinks, check boxes, icons, etc., associated with the ordered set of category values. After the user makes a selection, the client device 108 issues a request for a second search (generally to narrow the initial search results). The request for the second search can be transmitted via a communications network 106, such as the Internet. A service 104 obtains the request and issues a query including the selected category value as additional search criteria to the data store 102. For example, the user may have selected a "small" category value for a "size" search category in order to narrow the search result with a "woman, jean, pants" search query. The service 104 would issue a request to the data store 102 for a subset of the initial search results which have an attribute value of "small" for the "size" attribute field.

In response to the query, the data store 102 provides the service 104 a subset of the initial search result narrowed by the selected category value. Further, in one embodiment, the service 104 has pre-categorized the initial search results based on the search category values and the initial search results are grouped based on the pre-categorization. In this manner, when the user selects a category value for a search category to narrow the initial search result, the service 104 may not have to run an unnecessary search on the data store 102. Alternatively, the data store 102 provides a new search result which may not be the subset of the initial search result.

Once the service 104 obtains from the data store 102 a subset of the initial search results grouped by the selected category value, the service 104 may generate a new ordered set of category values for each search category based on the ranking information of data entries in the obtained subset. In one embodiment, the ranking information which was determined for the initial search result may be reused to generate the new ordered set of category values. Alternatively, the service 104 ranks the data entries within the subset of the initial result based on the ranking rules and policies. The new ranking information may be used to generate the new ordered set of category values for the predefined search categories.

The subset of the initial search results, the search categories, the new ordered sets of category values, and corresponding page data can be transmitted to a client device 108.

The subset, the search categories, the new ordered sets of category values, and corresponding page data can be transmitted via a communications network 106. Once the client device 108 obtains the corresponding attributes, the search categories, the new ordered sets of category values, and page data, the client device 108 can display the subset of the initial search results to a user. For example, the page data can be used to construct a user interface, such as a Web page, which can be used to present the subset of the initial search results in order of rank and the search categories with the ordered set of category values. The ordered sets of category values may be presented to users in such a way that the ordered sets of category values show the correlation with ranking information the displayed search results in a Web page. For example, the order of category values displayed in the Web page corresponds to rank information of the displayed data entries in the Web page.

Figure 3:
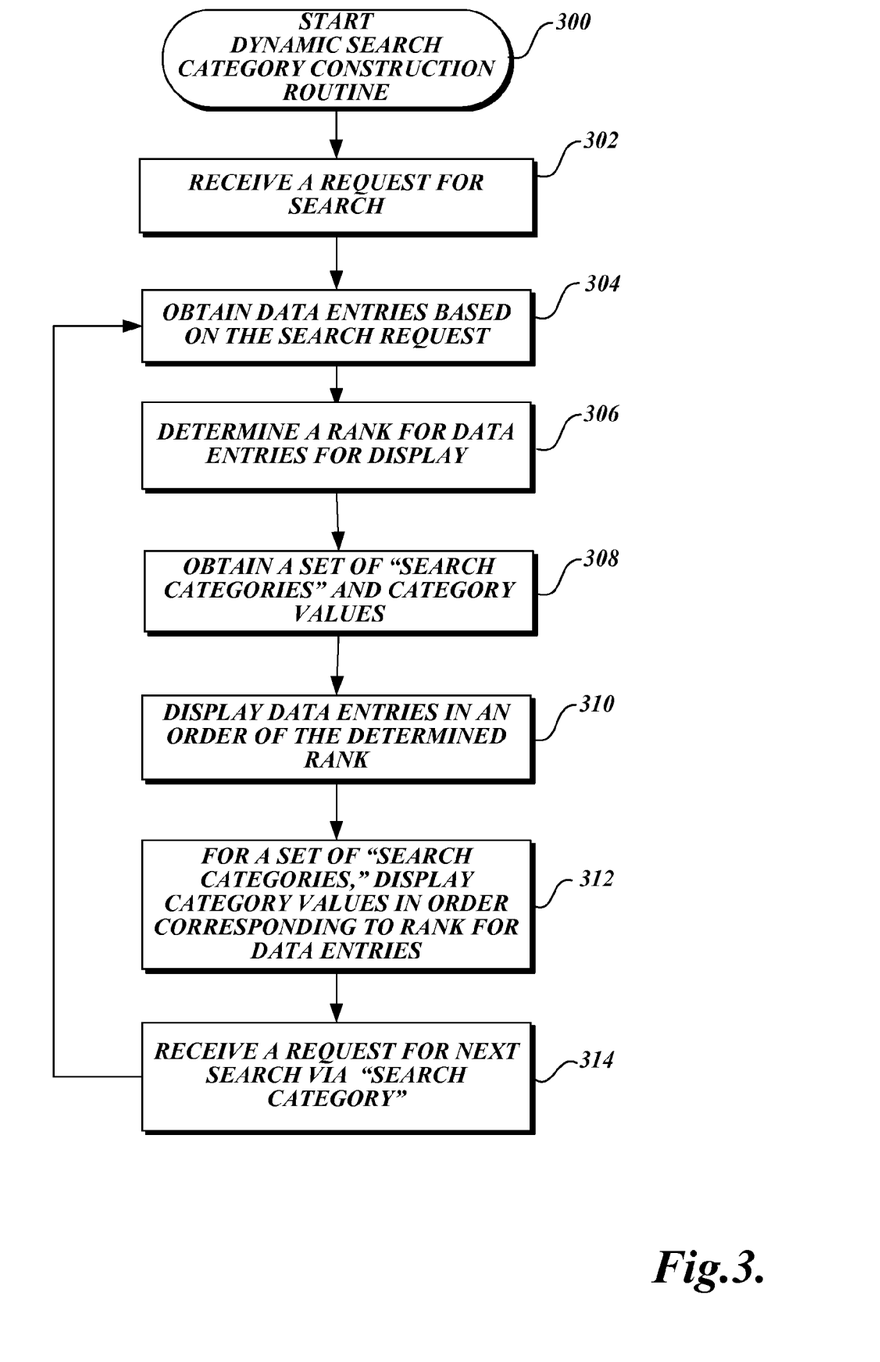
FIG. 3 is a flow diagram depicting an illustrative dynamic search category construction routine in accordance with an aspect of the present invention.

With reference now to FIG. 3, a flow diagram 300 illustrative of a dynamic search category construction routine will be described. At block 302, a request for search may be received from a user. As explained above, a user can input a search query or select a search query by clicking a hyperlink on a Web page. For example, referring to FIG. 4, a user can input "denims, women, pants" in a search description box 408 in the Web page 400. At block 304 data entries resulting from the search based on the search request are obtained. For example, the client device 108 can transmit to a service 104 a request for a search with a search query input by the user. The service 104 conducts a search with the search query on the data store and obtains data entries as a result. At block 306, the search results (data entries) are ranked based on ranking rules and policies. For example, ranking rules may specify that the searched data entries are to be prioritized based on a degree of relevance and also specify how to measure the degree of relevance. At block 308, the service 104 obtains a set of search categories and corresponding category values from the data store. Continuing with the example above, in FIG. 4, if the user has inputted "denims, women, pants" in a search query box 408, the search results, for example, the data entries that have attribute values relevant to the "denims, women, pants" description, may be obtained.

Figure 4:
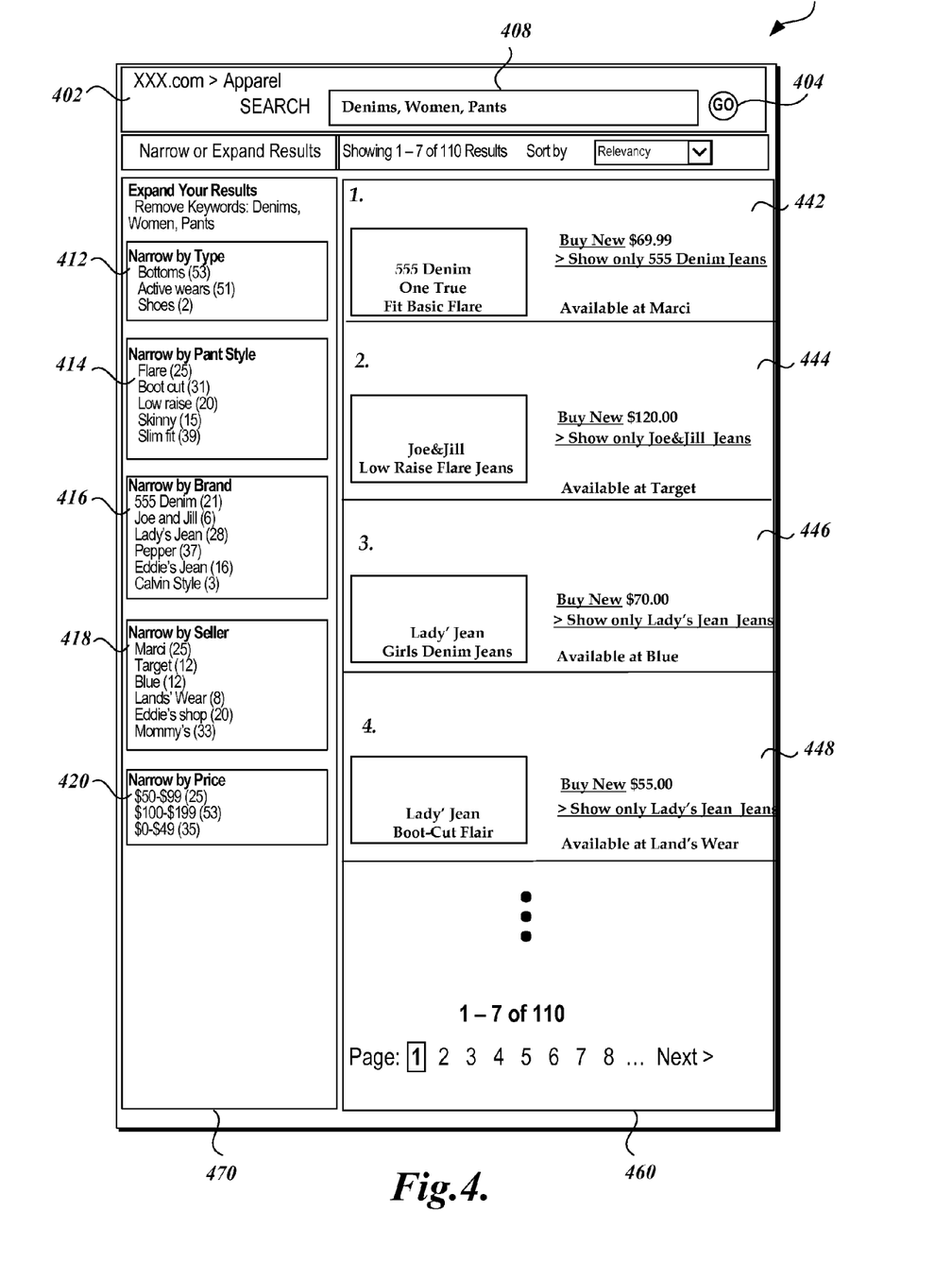
FIG. 4 is an illustrative screen display of the search results and search categories generated in response to the search query.

At block 310, the service 104 displays a subset of data entries in order of the ranks in the initial search result on the client device. At block 312, in conjunction with the display of data entries, the service 104 displays the search categories and category values in order corresponding to the determined ranks for the currently displayed data entries. Continuing with the example above, for the obtained search categories, such as "Type," "Pants Style," "Brand," "Seller," "Price," ordered sets of category values 412, 414, 416, 418, 420 are displayed to assist a user to narrow the initial search result, as depicted in FIG. 4. In one embodiment, the service 104 may generate the ordered set of category values of each search category based on the ranking information of the initial search result. In this example, the service 104 takes the first ranked data entry and identifies attribute values corresponding to category values for the search categories. Then, the service 104 takes the second ranked data entry and identifies attribute values of the data entry which correspond to category values for the search categories. The service 104 may repeat this for each data entry of the first set of data entries. The number of the first set of data entries may be specified in the set of rules and policies. Typically, the number of the first set of data entries may be limited by the layout of a display screen. The service 104 may generate an ordered set of category values based on the identified attribute values of the first set of data entries.

Continuing with the example above, for the "Style" category, a set of category values may be obtained from the data store. For the first set of data entries, for example, the data entries 440-446, the "Flare," "Low-rise," and "Boot-cut," attribute values are identified and an ordered set of category values including "Flare," "Low-rise," and "Boot-cut" is generated based on the ranks (rank information) of the first set of data entries as depicted in FIG. 4.

Referring back to FIG. 3, at block 314, a request may be received from the user for another search by selecting a particular category value from the displayed search categories. The routine 300 returns to block 304 where the service 104 obtains data entries from the data store which returns the data entries results of the second search, as narrowed by the selected category value. The routine 300 repeats the above mentioned steps.

With reference now to FIG. 4, an exemplary display screen 400 presenting the search results and receiving user manipulations on the displayed search results is depicted. The exemplary display screen 400 can include a browse menu 402 to enable a user to start a search to locate a specific item. For example, the browse menu 402 can include a search query box 408 where a user can input a search query (e.g., several search keywords), for example, "denims, women, pants." The user may select a search initiation button, such as "go" button 404, to submit the search query.

The inputted search query is transmitted to the service 104 which will return to the client device 108 the ranked initial search results. As mentioned above, upon receipt of a search request from the client device 108, the service 104 may issue a search query on the data store based on the search query included in the search request. In some instances, the search query may be processed to determine some meaningful keywords, relevancies among the determined keywords, etc. Further, other relevant information may be collected to enhance the search. For example, user profile information including user preference, previous search history, etc., may be considered to conduct a search with the determined keywords. Subsequently, the data store will provide the initial search results based on the search query. As will be appreciated by one of ordinary skill in the art, in addition to the search query box, the browse menu 402 may include a browser tree or a menu choice (not showing) consisting of product categories and subcategories that a user can select as a search keyword.

Upon receipt of the initial search result from the data store, the service 104 may sort or prioritize the data entries in the initial search results based on the ranking information of the data entries. The ranking information may be temporarily stored along with the data entries. A set of search categories and corresponding category values are also obtained from the data store for constructing the exemplary display screen. As will be appreciated by one of ordinary skill in the art, the set of search categories can be defined specifically to certain product categories or sub categories related to the data entries in the initial search results. For example, if the data entries in the initial search are related to a "book" product category, the search categories may be defined specifically for the book product category, which will differ from the search categories defined for an apparel product category.

The constructed page displays information in two separate sections: a ranked search results section 460 and a search category section 470. The ranked search results section 460 generally displays the initial search result in order of the ranking information for data entries. The search category section 470 generally display available search categories and ordered sets of category values for each search category.

If the initial search result is large, a set of first top ranked data entries will be displayed in a first Web page. As shown, a first set of data entries (e.g., first top four data entries) 442-448 are displayed in the first Web page 400. The remaining data entries will be displayed in the following Web pages based on the ranking information. The obtained search categories 412-420 will be displayed in the search category section 470 along with the ranked search result section 460. As mentioned above, each search category can further include category values that allow a user to narrow his or her search. The category values are displayed in order corresponding to the ranks of the first set of data entries. For example, "Pants Style" may be predefined as a search category for the "women's denim pants" product category and have a set of category values such as "Flare," "Boot-cut," "Low-rise," "Skinny," and "Others." If the first ranked data entry has an attribute value of "Flare," "Flare" is displayed first in the set of category values for the "Pants Style" search category. If the second ranked item has attribute values of "Flare" and "Low-rise" and, thus, "Low-rise" is displayed second in the set of category values for the "Pants Style" search category.

By clicking on one of the displayed category values, a user can narrow his or her search to a subset of the initial search results. This allows the user to quickly locate the specific item he or she is looking for, since the order of category values is correlated with the displayed data entries. Thus, when a user finds the first displayed data entry is relevant to the specific item the user is looking for, the user can easily find the category value corresponding to the first displayed data entry.

As shown, the exemplary display 400 can include illustrations that correspond to the several search categories which are pre-defined for the product category or sub-category of the search query. As shown, for the "women's denim pants" product category, "Type," "Pants Style," "Brand," "Seller," and "Price," search categories are predefined to be displayed. The "Type" search category 412 may be displayed including an ordered set of category values such as "Bottoms," "Active wears," and "Shoes." Likewise, the "Pants Style" search category 414 may be displayed including an ordered set of category values such as "Flare," "Boot-cut," "Low-rise," "Skinny," and "Slim Fit." Further, the "Brand" search category 416 may be displayed including an ordered set of category values such as "555 Denim," "Joe and Jill," "Lady's Jean," "Pepper," and more. The "Seller" search category 418 may be displayed including an ordered set of category values such as "Marci," "Target," "Blue," "Land's wear," "Eddie's Shop," etc. The "Price" search category 420 may be displayed including an ordered set of category values such as "$50-$99," "$100-$199," "$0-$49," etc.

In one embodiment, the search categories may be displayed informing the number of data entries corresponding to a category value. As shown, for the "Type" search category, fifty three data entries have an attribute value of "Bottoms," fifty one data entries have an attribute value of "Active wear," and two data entries have an attribute value of "Shoes." Additionally, some search categories can be grouped into a single category or different search categories can be obtained if the user desires to expand or narrow the search result. The user can remove one or more keywords from the search query for various reasons.

As will be appreciated by one of ordinary skill in the art, the order or selection of category values can be overwritten by a human administrator or a qualified user. For example, if there is a need to have a particular category value as a first choice for a corresponding search category regardless of ranked data entries, the service may allow a human administrator to change category values in the ordered set or update the order of the category values for the search category.

Figure 5A:
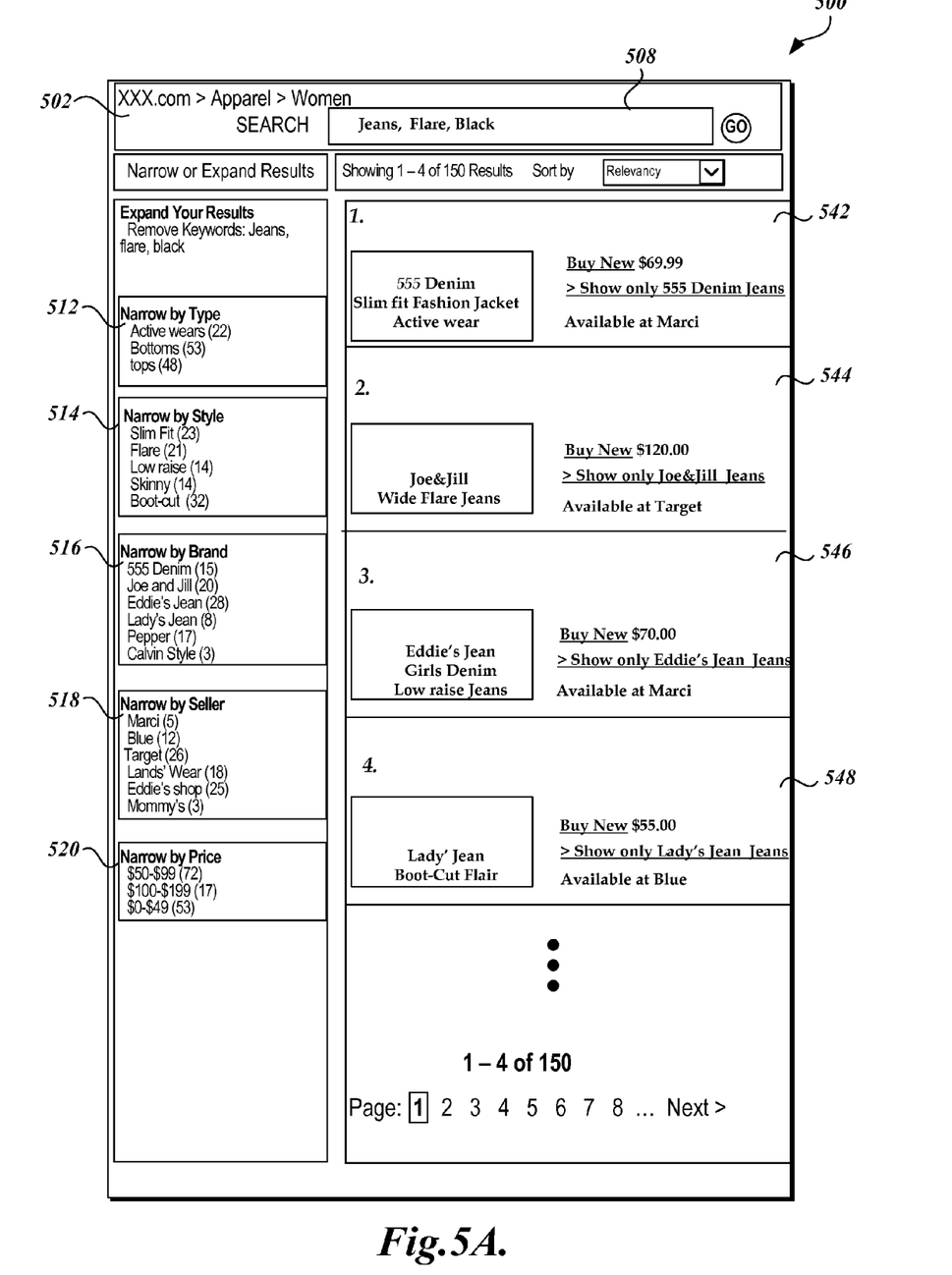
FIG. 5A is an another illustrative screen display of the search results and the search categories generated in response to the search query.

With reference now to FIG. 5A, another exemplary display screen 500 presenting the search results and receiving user manipulations on the displayed search results is depicted. As with FIG. 4, the exemplary display screen 500 can include a browse menu 502 to enable a user to start a search to locate an item. For example, the browse menu 502 can include a search query box 508 where a user can input a search query, such as "jeans, flare, black." The inputted search query is transmitted to the service 104, which will return to the client device the ranked initial search results. Upon receipt of the initial search from the data store, the service 104 may sort or prioritize the data entries in the initial search results based on some defined policy. A set of search categories and corresponding category values are also obtained for the exemplary display screen.

A first set of data entries, for example data entries identifying items 542-548, will be displayed in the first Web page 500. The obtained search categories 512-520 will be displayed along with the first set of data entries so that a user can quickly make a decision to narrow the search. Each search category can further include a set of category values that allow a user to select to use as additional search criteria for narrowing his or her search. The set of category values are displayed for a search category in order corresponding to the ranks of the first set of data entries. For example, "Style" may be predefined as a search category for "Jean" which is predefined for the "Women" product category and to automatically display a ordered set of category values such as "Slim-fit," "Flare," "Low-rise," "Skinny," "Boot-cut," etc. If the first ranked data entry has "Slim-fit" for the "Style" attribute field, "Slim-fit" is displayed first in the ordered set of category values for the "Style" search category. If the second ranked data entry has "Flare" for the "Style" attribute field and, thus, "Flare" is displayed second in the ordered set of category values for the "Style" search category.

As shown, the exemplary display 500 can include illustrations that correspond to the several search categories which are pre-defined by a set of rules and policies. The search category may be displayed including a description of a category value and information about the number of data entries where the category value exists as an attribute value. For example, the "Type" search category 512 is displayed including an ordered set of category values such as "Active wears," "Bottoms," and "Tops" in conjunction with the number of corresponding data entries. Likewise, the "Style" search category 514 is displayed including an ordered set of category values such as "Slim-fit," "Flare," "Low-rise," "Skinny," "Boot-cut," etc. Further, the "Brand" search category 516 is displayed including an ordered set of category values such as "555 Denim," "Joe and Jill," "Eddies' Jean," "Lady's Jean," "Pepper," and more. The "Seller" search category 518 is displayed including an ordered set of category values such as "Marci," "Target," "Blue," "Land's wear," "Eddie's Shop," etc. The "Price" search category 520 may be displayed including an ordered set of category values such as "$50-$99," "$100-$199," "$0-$49," etc.

Through manipulations in the exemplary displayed screen, a user can make a selection of a category value from the ordered set of category values for each search category. For example, a category value could be selected by clicking one of graphic components displayed on the Web page, such as hyperlinks, check boxes, icons, etc., associated with the ordered set of category values for the search categories. After the user makes the selection, the client device 108 issues a request for a second search (generally to narrow the initial search results) with a query including additional search criteria which is the selected category value. The request for the second search can be transmitted via a communications network 106, such as the Internet.

Figure 5B:
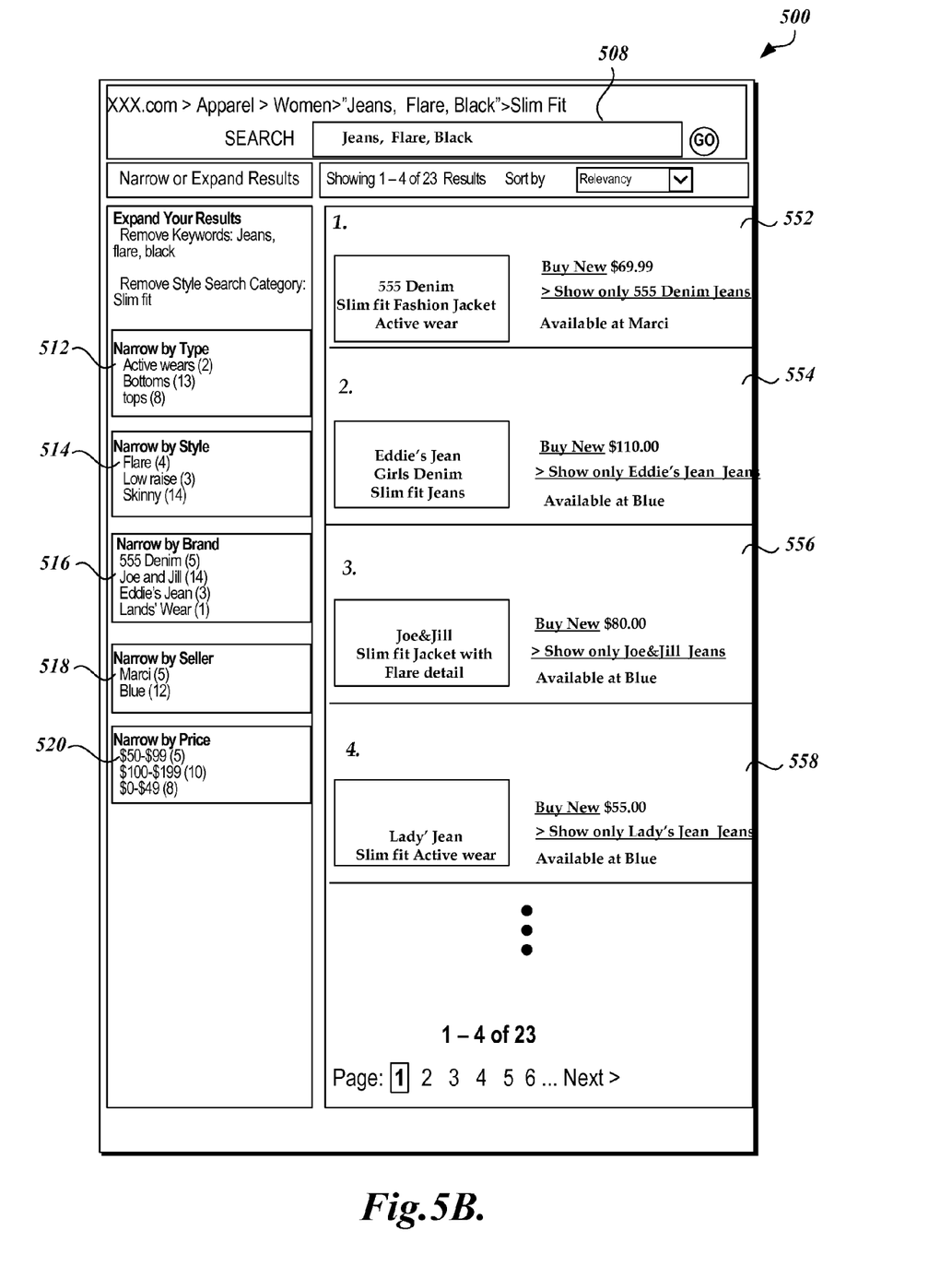
FIG. 5B is the illustrative screen display of the search results and the search categories generated after the initial search results are narrowed by a selected category value.

With reference now to FIG. 5B, the exemplary display screen 500 presenting a subset of the initial search result after receiving user selection on a category value from the search categories is depicted.

Upon receipt of the user selection, the service 104 will obtain a subset of the initial search corresponding to the user selection. For the purposes of discussion, assume that the initial search result can be grouped into several subsets of data entries based on the category values for the search categories to narrow the initial search results. For example, for the "Style" category, there can be five subsets of the initial search result, corresponding to the set of category values such as "Slim fit," "Flare," "Low-rise," "Skinny," and "Boot-cut." In one embodiment, the user can select several category values. The service 104 may conduct a new search using the search query and the selected category values on the data store. When the user selects "Slim fit" from the set of category values for the "Style" category to narrow the search, the client device transmits the user selection ("Slim fit") to the service 104. Subsequently the service 104 obtains a subset of data entries (hereinafter, "second search results") having an attribute value of "Slim-fit." As discussed above, the service 104 may re-rank the second search results based on the ranking policies and rules, or the rank information determined for the initial search results. The order of the category values for each search category will be determined again for the second search results. Typically, the second search results are a smaller list than the initial search results.

As shown, the second search results 552-558 which are narrowed by the "Slim fit" category value are displayed. As with FIG. 5B, the search categories 512-520 will be displayed along with the second search results 552-558 and each search category can further include an ordered set of category values that will allow a user to narrow his or her search. The ordered set of category values is generated based on the ranks of the second search results 552-558. If the second search result is too large, a limited number of data entries having high ranks will be selected and used to determine the order of the category values.

For example, the "Seller" search category 518 includes two category values, such as "Marci," and "Blue." Since the first ranked data entry 552 has the attribute value of "Marci," "Marci" is displayed first in the ordered set of category values for the "Seller" search category. The second ranked data entry 542 has the attribute value of "Blue" for the "Seller" attribute field and, thus, "Blue" is displayed second in the ordered set of category values for the "Style" search category. Referring back to FIG. 5A, the "Seller" search category in this exemplary display includes more category values such as "Target," "Land's wear," "Eddie's Shop," "Mommy's." It is to be understood that if one of the category values does not have any corresponding data entries, the category value will not be displayed. In one embodiment, a maximum number of category values for each search category may be defined.

As with FIGS. 4 and 5A, by clicking on a displayed category value, a user can further narrow his or her search to a subset of the second search results, with each data entry where the displayed category value exists as an attribute value. In one embodiment, a user can provide a preference for ranking the search results. For example, a user can request to sort the displayed search results by a degree of relevancy, price, most popular, etc.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for dynamically displaying categorized information about items, the computer-implemented method comprising:
   under control of one or more computing devices configured with executable instructions,
      receiving a search query about an item;
      generating search results related to the item based at least in part on the search query;
      determining ranks for the search results and identifying a first subset of the search results based at least in part on the determined ranks;
      identifying search categories related to the item;
      obtaining a set of category values for each search category based at least in part on at least one attribute of each item referenced by the first subset of the search results;
      ordering each set of category values based at least in part on the determined ranks of the first subset of the search results; and
      causing at least a portion of the ordered set of category values to be displayed for each search category, wherein the ordered set of category values enable a user to narrow the search for the item by selecting one or more of the category values.

2. The computer-implemented method of claim 1, wherein the first subset of the search results has a threshold number of the search results.

3. The computer-implemented method of claim 1, wherein obtaining the set of category values includes: for each of the first subset of the search results, selecting a category value if an attribute value corresponding to the category value exists in attributes of items referenced by the first subset of the search results.

4. The computer-implemented method of claim 3, wherein the selected category value becomes a part of the ordered set of category values.

5. The computer-implemented method of claim 3, wherein the selected category value is ordered in the ordered set of category values based at least in part on the ranks for the first subset of the search results.

6. The computer-implemented method of claim 1, further comprising receiving a selection from the displayed set of category values.

7. The computer-implemented method of claim 6, further comprising: including a search result in a second subset of the search results if the search result references an item having an attribute corresponding to a category value for a search category, wherein the category value is one from the ordered set of category values for the search category.

8. The computer-implemented method of claim 7, wherein, upon receipt of the selection of the displayed category value, at least a portion of the second subset of the search results corresponding to the displayed category value is displayed.

9. The computer-implemented method of claim 8, wherein the displayed category value is a graphic component which is configured at least to identify the second subset of the search results.

10. The computer-implemented method of claim 9, wherein the second subset of the search results is ranked based at least in part on a ranking policy.

11. The computer-implemented method of claim 10, wherein another ordered set of category values is generated for each search category based at least in part on the ranks for the second subset of the search results.

12. The computer-implemented method of claim 11, wherein the ranking policy indicates to use a degree of relevancy between a search result and the search query.

13. The computer-implemented method of claim 1, wherein, upon receipt of the selection of the displayed category value, a new search query, including the displayed category value and the obtained search query, is issued.

14. The computer-implemented method of claim 13, wherein a search with the new search query is conducted with respect to a same data store as the search query.

15. The computer-implemented method of claim 1, wherein the identified search categories are defined for a product category of the item.

16. A computer system for displaying search categories, the computer system comprising:
   at least one data store collectively storing information relating to a set of search categories and information about available items; and
   a computing device in communication with the at least one data store, the computing device configured to, at least:
      receive a search query to locate an item;
      obtain an initial set of search results from a search on the at least one data store with the search query and determine a rank for each search result in the initial set of search results;
      identify a first subset of the initial set of search results based at least in part on the determined ranks;
      for each category in the set of search categories,
         obtain a set of category values which are to be displayed to assist a user to refine the initial search result, the set of category values being based at least in part on at least one attribute of each item referenced by the first subset of the initial set of search results; and
         order the set of category values based at least in part on the determined ranks of the first subset of the initial set of search results; and display the ordered set of category values in the ordering in a manner enabling a user to refine the initial search result by selecting at least one of the category values.

17. The computer system of claim 16, wherein the computing device receives a selection of the displayed category value from a user, the selection of the displayed category values being made from the ordered set of category values.

18. The computer system of claim 17, wherein, upon receipt of the selection of the displayed category value, the computing device issues a new search query including the displayed category value and the obtained search query.

19. The computer system of claim 18, wherein the computing device is further operative at least to obtain a new set of search results from a search with the new search query on the at least one data store.

20. The computer system of claim 19, wherein ranks for each of the new set of search results are determined based at least in part on a ranking policy.

21. The computer system of claim 20, wherein another ordered set of category values is generated for each search category based at least in part on the ranks for the new set of search results.

22. The computer system of claim 21, wherein the ranking policy indicates to use relevancy scores of a search result.

23. The computer system of claim 16, wherein for each search category, the computing device selects category values if the attribute value of at least one item referenced by the first subset of the initial set of search results corresponds to one of the category values.

24. The computer system of claim 16, wherein the computing device generates the ordered set of category values for the search category with the selected category values.

25. The computer system of claim 16, wherein for each search category, a set of category values for the search category are predefined in the at least one data store.

26. The computer system of claim 16, wherein the computing device groups ones of the initial set of search results into several subsets based at least in part on attribute values.

27. The computer system of claim 26, wherein each subset includes search results referencing items that have attribute values corresponding to one or more category values.

28. The computer system of claim 27, wherein the displayed category value is a graphic component which identifies the subset corresponding to the displayed category value.

29. The computer system of claim 28, wherein search results in the subset are ranked based at least in part on relevancy information.

30. A computer-readable medium facilitating computer-executed components for displaying search categories comprising:
a data-store interface component for obtaining a set of search results based at least in part on a search query, the set of search results are ranked based at least in part on relevancy information, and for obtaining a set of search categories related to the search query, each search category associated with a set of category values based at least in part on at least one attribute of at least one item corresponding to at least one of the set of search results; and
a user-interface component for displaying the set of category values of each search category in an order that is based at least in part on the rank associated with each of at least a subset of the set of search results, and for receiving a selection from the displayed set of category values,
wherein the user-interface component enables a user to select a category value from the displayed set of category values in order to narrow the search query.

31. The computer-readable medium of claim 30, wherein the set of search results are displayed in rank order.

32. The computer-readable medium of claim 30, wherein the user-interface component enables a user to select a category value from the displayed set of category values in order to start a new search.

33. A computer system for displaying category values for search categories, the computer system comprising:
at least one data store for storing information relating to a set of search categories and information about available items; and
a computing device in communication with the at least one data store, the computing device configured to, at least:
obtain ranked data entries corresponding to search results and identify a first set of the ranked data entries, each ranked data entry containing item attributes;
for each of the set of search categories, obtain an ordered set of category values which are to be displayed to assist a user to refine the initial search result, said ordered set of category values in an ordering that is based at least in part on the ranking of the ranked data entries, and wherein for each search category, a set of category values for the search category are predefined in the at least one data store;
display the ordered set of category values based at least in part on the item attributes and the rank associated with each of at least a subset of the first set of data entries;
receive a selection of at least one displayed category value from a user, the selection of the at least one displayed category value being made from the ordered set of category values; and
in response to receipt of the selection, display a set of search results specific to the at least one displayed category value.

34. The computer system of claim 33, wherein for each search category, the computing device selects category values if a data entry of the ranked data entries has an attribute value corresponding to one of the category values.

35. The computer system of claim 34, wherein the computing device generates the ordered set of category values for the search category with the selected category values.

* * * * *